H. R. JERNIGAN.
PEANUT SHELLER OR HULLER.
APPLICATION FILED JULY 10, 1916.

1,229,966.

Patented June 12, 1917.
3 SHEETS—SHEET 1.

Witnesses

Inventor
H. R. Jernigan,
By Victor J. Evans
Attorney

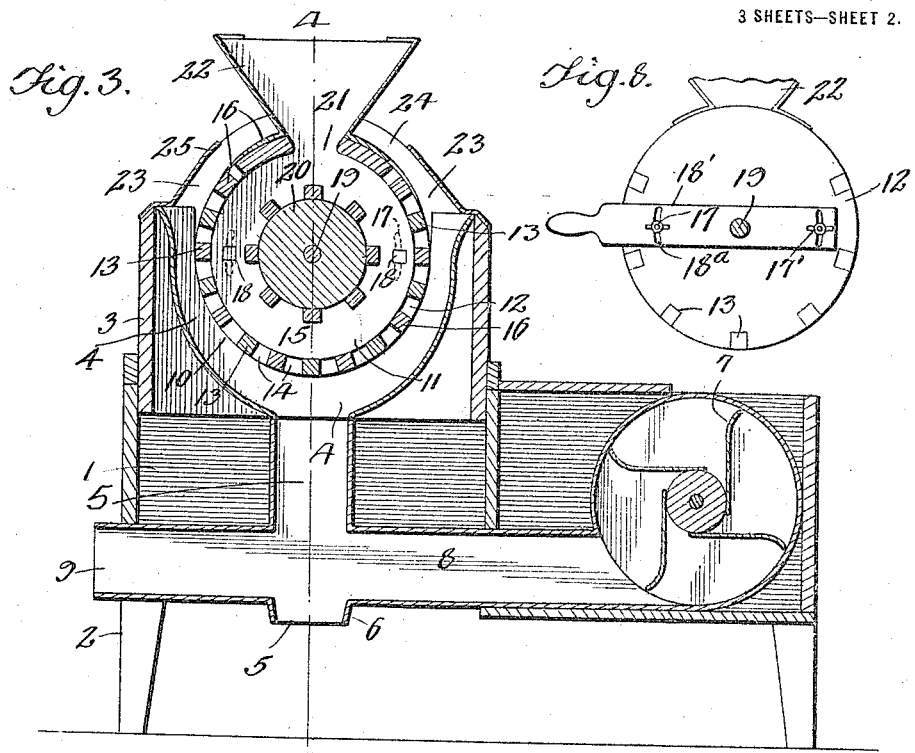
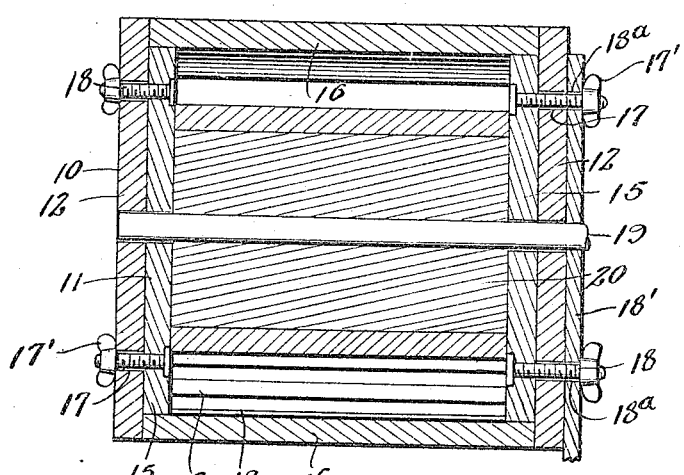

H. R. JERNIGAN.
PEANUT SHELLER OR HULLER.
APPLICATION FILED JULY 10, 1916.

1,229,966.

Patented June 12, 1917.
3 SHEETS—SHEET 3.

Witnesses

Inventor
H. R. Jernigan,
By Victor J. Evans
Attorney

UNITED STATES PATENT OFFICE.

HENRY R. JERNIGAN, OF ARITON, ALABAMA.

PEANUT SHELLER OR HULLER.

1,229,966.   Specification of Letters Patent.   Patented June 12, 1917.

Application filed July 10, 1916. Serial No. 108,453.

*To all whom it may concern:*

Be it known that I, HENRY R. JERNIGAN, a citizen of the United States, residing at Ariton, in the county of Dale and State of Alabama, have invented new and useful Improvements in Peanut Shellers or Hullers, of which the following is a specification.

This invention relates to a machine for shelling or hulling peanuts, and other similar nuts, beans, etc., contained in shells or pods, one object of the invention being to provide a machine of the character described which will operate to effectually remove the shells or hulls without injury to the nut or other contained edible.

A further object of the invention is to provide a shelling machine, embodying a shelling drum and rotating cylinder arranged therein, said drum and cylinder having coöperating slats for breaking up the shells, the slats in the drum being relatively adjustable to vary the sizes of the openings between the same, through which the nuts and shells are discharged, whereby nuts of different sizes may be shelled without injury.

The invention consists of the features of construction, combination and arrangement of parts hereinafter fully described and claimed, reference being had to the accompanying drawings in which:—

Fig. 3 is a vertical longitudinal section through the machine.

Fig. 5 is a longitudinal section, on an enlarged scale, through the drum.

Fig. 8 is a side elevation, with parts in section, of the drum, showing more particularly the means for relatively adjusting the inner and outer drum members.

Figure 1:
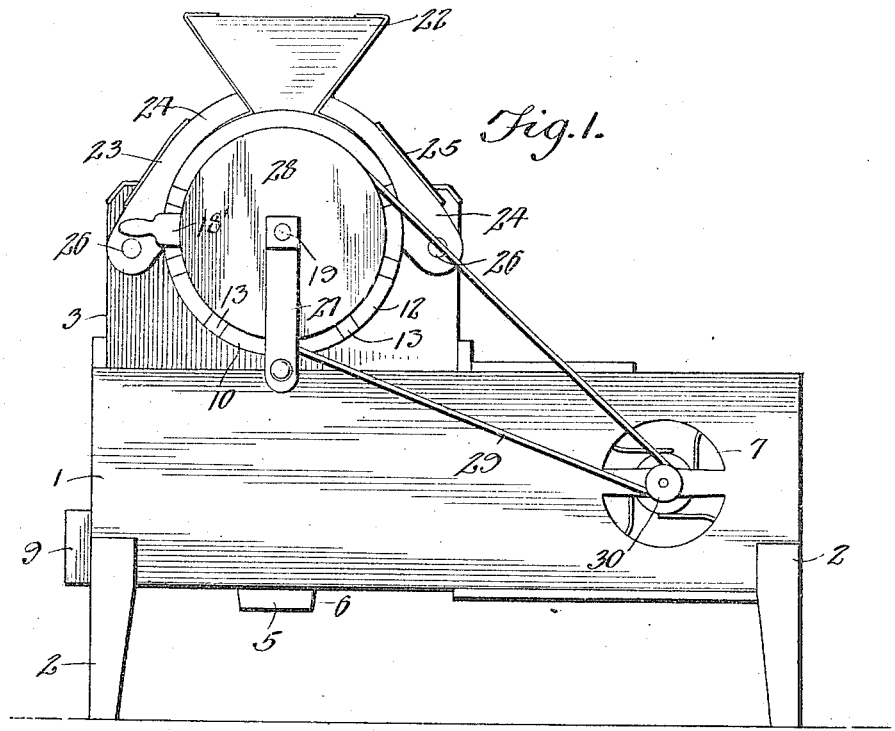
Figure 1 is a side elevation of a peanut shelling machine embodying my invention.
Figure 2:
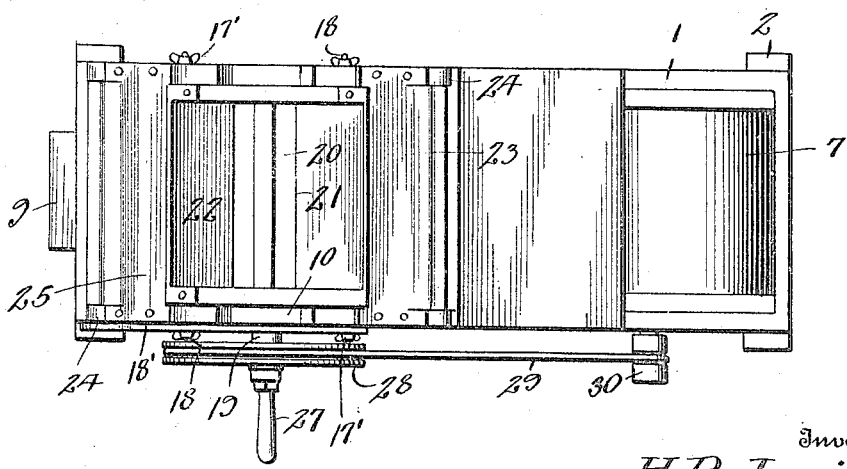
Fig. 2 is a top plan view of the same.
Figure 4:
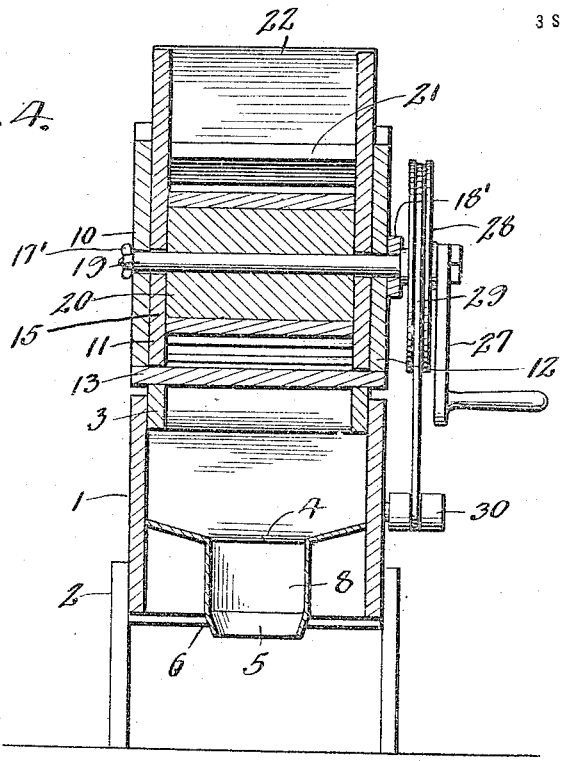
Fig. 4 is a vertical transverse section on the line 4—4 of Fig. 3.
Figure 6:
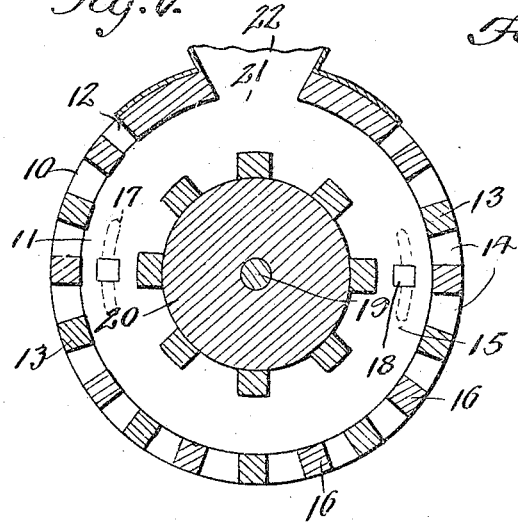
Fig. 6 is a transverse section, on an enlarged scale, through the drum.

In carrying my invention into practice, I provide a frame or casing 1, shown in the present instance as provided with supporting legs 2 to rest squarely upon the surface of the floor or ground.

Supported at the forward end of the casing is a semi-circular receiving trough or cradle 3 forming an outlet chamber 4 having an outlet passage 5 arranged in alinement with a discharge chute or spout 6, through which chute or nozzle the shelled nuts are discharged by gravity into a suitable receptacle. Arranged at the forward end of the casing is a fan or blower 7 which is connected by an air blast duct or conductor 8 with one side of the spout 6, with the opposite side of which communicates a conductor 9 for the discharge of the shells and other refuse.

The hulled peanuts and broken shells pass from the hulling drum and cylinder, hereinafter described, into the chamber 4 and thence fall by gravity through the outlet 5. In passing from the outlet 5 to the spout 6 the nuts are subjected to the force of the blast of air passing through the conductor 8 from the fan 7 whereby the shells and other light particles are blown forwardly to and through the conductor 9, while the nuts continue to drop or discharge by reason of their greater specific gravity through the spout 6 into any suitable receptacle.

The hulling mechanism comprises a drum composed of concentric drum members 10 and 11. The drum 10, as shown, comprises an outer drum consisting of heads 12 and spaced slats 13 extending between the same and forming discharge passages 14, while the drum 11 forms an inner drum composed of spaced heads 15 and spaced slats 16. The two drums are adjustably connected to rotate in unison, and the slats 16 of the inner drum are arranged in the spaces 14 between the slats 13 of the outer drum, the two sets of slats coöperating to form intervening discharge passages. These passages may be varied in size by rotatably adjusting the drums with respect to each other. To this end arcuate slots 17 are provided in the heads 12 to receive fastening members 18 such as bolts or screws, engaging and passing through the heads 15, the said bolts being provided with wing nuts 17' for a clamping action. At one side of the drum is an adjusting lever 18' which is pivotally mounted on the shaft 19 and provided with slots 18ª receiving the adjacent bolts, so that by slacking the nuts at each side of the drum the drums may be relatively adjusted in a convenient and obvious manner by means of the lever, after which the nuts may be tightened to clamp the parts in adjusted position.

In order that the mode of adjusting the drums to regulate the size of the discharge openings may be fully understood, it may be assumed that the slats 16, when in neutral position are disposed equidistantly between adjacent slats 13. When so disposed the openings between the slats will be of the smallest size, too small for the discharge grains or nuts of normal size, the discharge openings being thus in inoperative condition. By turning the inner drum 11 to adjust each of its slats 16 toward one of the adjacent slats 13 of the drum 10 and away from the other adjacent slat 13 of said drum 10, it will be understood that the openings of one side of the slats 16 will be further contracted while the openings on the other side of said slats 16 will be correspondingly enlarged, the enlarged openings serving the function of outlets. It will therefore be apparent that by regulating the size of these enlarged openings or outlets, the outlets may be regulated in size as desired according to the sizes of the grains or nuts to be discharged.

Journaled in the heads 12 is a shaft 19, and fastened to said shaft to rotate within the inner drum is a slatted cylinder 20, which is adapted to be revolved for the purpose of agitating the nuts introduced into the drum and subjecting the shells to a crushing pressure for the purpose of cracking the same and freeing the nuts. By varying the sizes of the outlets in the drum to suit the size of the nuts under treatment, it will be apparent that the cylinder will act with a crushing pressure which is just sufficient in all ordinary cases to crush the shell and nut more, thus breaking up the shell without injury to the nut, both nuts and shells discharging through the passages 14 into the chamber 4 for separation and discharge in the manner previously described. In this manner nuts which even vary to some extent in size within reasonable limits, may be shelled with injury only to a very small percentage of the nuts, leaving the vast majority of the nuts free and clear from bruises or injuries of any kind.

The top of the drum is provided with an inlet 21 communicating with a V-shaped hopper 22 into which the peanuts are introduced for a feeding action to the huller. The drum is removably supported in the receiving trough or cradle 3 and is adapted to be secured therein by hinged clamping members 23, each composed of a pair of swinging arms 24 and a guard plate 25 connecting the same, said arms being removably secured to the drum by suitable fastening members 26 upon the removal of which the clamps may be swung backward to free the huller for withdrawal. When the clamps are in applied position, the guard clamps thereof cover the passages 14 above the horizontal center of the drum and prevent discharge of the nuts at this point.

The shaft 19 may be driven in any preferred manner. In the present instance I have shown it provided with a crank handle 27 for manual operation, although it may be provided with power driving connections of any suitable kind. On the shaft is also a pulley or belt wheel 28, connected by a drive belt 29 with a pulley 30 on the fan shaft, whereby in the operation of the machine the cylinder and fan will be simultaneously driven.

Figure 7:
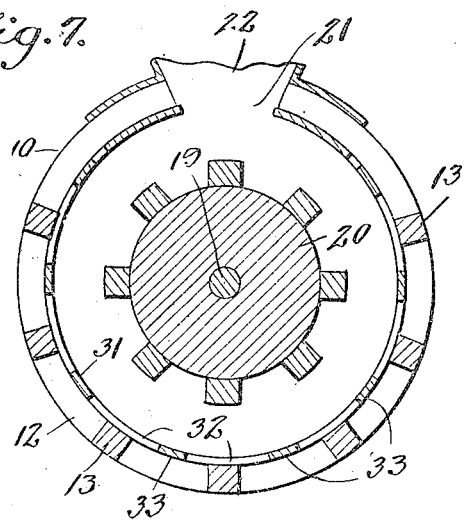
Fig. 7 is a transverse section through a modified form of drum.

In some cases I may dispense with the construction of an inner drum composed of end heads and slats and substitute in lieu thereof a sheet metal inner drum 31 as shown in Fig. 7, formed of sheet metal and having discharge slots 32 therein, the slots and intervening portions of the sheet metal drum, which serve as breaking slats or surfaces 33, coöperating with the slats and openings in the outer drum in the same manner as the coöperating parts of the form of inner drum previously described.

From the foregoing description, taken in connection with the drawings, the construction of my improved peanut hulling or shelling machine will be readily understood without further description, and it will be seen that the invention provides a device of this character which is not only simple of construction and economical of production but will operate upon the nuts to effectually free the same from the shells with a minimum liability of damage to the nuts. While the construction disclosed is preferred, it will, of course, be understood that changes in the construction within the scope of the appended claims may be made without departing from the spirit or sacrificing any of the advantages of the invention.

I claim:—

1. In a peanut shelling or hulling machine, the combination of an inner hulling drum having a slatted surface, an outer hulling drum having a slatted surface, said drums being provided with end heads, a shaft extending through said heads, a cylinder mounted upon said shaft to rotate within the inner drum, and means journaled upon the shaft and operatively mounted upon one of the drum heads for adjustment for shifting said drums to adjust their slats with relation to one another whereby to vary the sizes of the openings between the slats of the outer drum.

2. A hulling machine comprising an inner slatted drum, an outer slatted drum, said drums being provided with end heads, one of the end heads of the inner drum having bolts extending therefrom, and the adjacent end head of the outer drum having segmental slots for the passage of said bolts, a shaft extending through the drums and their heads, a cylinder mounted upon said shaft within the drums, a lever pivotally mounted upon the shaft in proximity to the slotted head and having slots receiving said bolts, whereby the drums may be relatively adjusted axially, and nuts upon the bolts for clamping the same in adjusted position.

3. In a peanut shelling or hulling machine, the combination of an inner hulling drum having a slatted surface, an outer hulling drum having a slatted surface, a shaft extending through said drums, a beater mounted upon said shaft to rotate within the inner drum, and means journaled upon the shaft and operatively associated with one of the drums for shifting said drums to vary the sizes of the openings between the slats of the other drum.

HENRY R. JERNIGAN.

Copies of this patent may be obtained for five cents each, by addressing the "Commissioner of Patents, Washington, D. C."